United States Patent [19]

Hill

[11] 3,847,629

[45] Nov. 12, 1974

[54] REFRACTORIES

[75] Inventor: Nigel Austin Hill, Stourport-on-Severn, England

[73] Assignee: Morgan Refractories Limited, Neston, Wirral, England

[22] Filed: Sept. 1, 1972

[21] Appl. No.: 285,649

[30] Foreign Application Priority Data
Sept. 17, 1971   Great Britain .................... 43396/71

[52] U.S. Cl. .................................... 106/65, 106/66
[51] Int. Cl. .............................................. C04b 35/10
[58] Field of Search ............... 106/66, 65, 85, 108.5

[56] References Cited
UNITED STATES PATENTS

| | | | |
|---|---|---|---|
| 2,261,400 | 11/1941 | Morgan | 106/66 |
| 3,329,516 | 7/1967 | Chvatal | 106/66 |
| 3,652,204 | 3/1972 | Akazawa et al. | 106/66 |

*Primary Examiner*—J. Poer
*Attorney, Agent, or Firm*—Larson, Taylor & Hinds

[57] ABSTRACT

Phosphate-hardening refractory compositions contain chromic orthophosphate as the phosphate, to give long shelf life as a mouldable.

3 Claims, No Drawings

REFRACTORIES

The invention relates to refractories.

Phosphoric acid and certain of its acid salts, for example aluminium acid phosphate, act as chemical binding agents in the manufacture of refractories containing refractory oxides and silicates, of which the oxides and silicates of aluminium are of particular merit because of their very refractory nature.

Phosphoric acid and acid salts of phosphoric acid when mixed with the oxides, hydrates and silicates of aluminium in the presence of water react with them when stored for any length of time, causing the mixtures to harden slowly and lose plasticity even when loss of moisture has been prevented.

Such hardening is undesirable, particularly in certain types of compositions, known as mouldables, that depend for their application on their ability to retain plasticity and ease of working for long periods of time and to harden only when fired to give the final refractory.

We have found that if a phosphate that is insoluble in water at ordinary temperatures is used in the compositions, and in particular chromic orthophosphate in the form of a powder, the reaction is much slowed and in a mouldable for example a shelf life of up to three months is readily achieved.

The invention accordingly provides a composition, particularly a mouldable, hardenable on firing to give a refractory and containing one or more phosphate-bondable refractory aggregates together with a water insoluble chromium phosphate, particularly chromic orthophosphate, or other water insoluble phosphate as a bonding agent.

The chromic orthophosphate used may be the commercial material, which contains impurities and is in any event not of the strict chemical composition Cr (III) $PO_4$; nevertheless it is a satisfactory material. That used in the examples below approximates to the formula $CrPO_4.3H_2O$, with a $Cr_2O_3$ content of 35 – 37 percent.

The reason for the resistance of the compositions to hardening is not known, but it is supposed that with chromic orthophosphate for example the insolubility, and also as of possible significance the non-acid nature, of the phosphate prevents attack on the oxide and other components of the compositions at storage temperatures, although a high-strength phosphate bond is developed at the temperatures of 600° to 800°C at which the compositions are fired when being brought into service.

In practice orthophosphoric acid is preferably also added to the compositions in an amount that, while not itself sufficient to effect the bonding when the compositions are fired, nor to cause premature hardening in storage, gives a degree of air-hardening or stiffening in drying of the compositions at ambient temperatures before they are fired, and also some low-temperature strength at 300° – 400°C.

It is not suggested that orthophosphoric acid is the only water soluble acidic phosphate material that may be added.

Chromic orthophosphate may form 0.5 to 10 percent by weight of the compositions, although other proportions are not excluded. The phosphoric acid may be in addition to the insoluble phosphate or instead of part of it, constituting for example up to 10 percent of a total 10 percent phosphates (i.e. 1 percent on the composition), again by weight.

Chromic orthophosphate has little plasticising action and accordingly for most purposes a plasticiser such as clay, at for example 3 to 15 percent by weight, or an organic plasticiser at for example 1 to 5 percent, should be present in the compositions.

The invention has particular application to alumina-based compositions, which give refractories of outstanding slag and wear resistance and are finding increasing acceptance.

Applications include soaking-pit linings, the bottoms of steel ingot moulds, and critical areas in arc melting furnaces.

The invention is illustrated in the following Examples, in which references to workability are to values determined according to the procedure of ASTM C 181–47.

EXAMPLE 1

The following composition was made up:

| | Parts by Weight |
|---|---|
| Alumina grog mixture 4/100 mesh | 64 |
| Fine alumina (particle size about 10 microns) | 19 |
| Ball clay/china clay (equal amounts) | 10 |
| Raw kyanite | 7 |
| Chromic orthophosphate powder (Albright & Wilson) | 1.25 |
| Phosphoric acid ($H_3PO_4$ 67% solution) | 0.75 |
| Water | 9 |

Fused alumina grog was used but tabular alumina is also suitable.

In a four-month storage test with weekly determinations of workability the value, initially 26 percent, remained above 22 percent even after sixteen weeks of storage. In contrast in a similar composition containing two parts of 67 percent phosphoric acid and eight parts water (i.e. no chromic orthophosphate), the initial workability, although higher at 30 percent, came down after sixteen weeks of storage to a value below 12 percent, which is regarded as unacceptable. (For example the U.K. Central Electricity Generating Board's standard No. 07891 of 1971 calls for workability to be not more than 30 percent and not less than 15 percent).

The composition gave an excellent refractory when fired.

EXAMPLE 2

A composition as in Example 1 but containing two parts of the chromic orthophosphate with eight parts of water (i.e. no phosphoric acid) was similarly stored and tested. The workability, initially 34 percent, remained above 24 percent for ten weeks and after twelve weeks was still above 20 percent.

The composition gave an excellent refractory. The crushing strength after firing at 1,000°C was 9,000 p.s.i.

I claim:

1. A plasticized mouldable alumina-base composition hardenable on firing to give a refractory, and consisting essentially of an alumina aggregate, a plasticizer, and a water-insoluble chromium phosphate as a bonding agent for the alumina, said phosphate forming 0.5 to 10 percent by weight of the composition.

2. A composition according to claim 1, in which the phosphate is commercial grade chromium orthophosphate approximating to the composition $CrPO_4.3H_2O$ and to a $Cr_2O_3$ content of 35 to 37 percent by weight.

3. A composition according to claim 1, containing, in addition to the water-insoluble phosphate, orthophosphoric acid or other water-soluble acidic phosphate in an amount up to 1 percent by weight of the composition.

* * * * *